W. T. Tunnard,
Walking Planter.

No. 93,140.   Patented July 27, 1869.

Witnesses:
Rafus R. Rhodes
H. N. Jenkins

Inventor:
W. T. Tunnard

United States Patent Office.

W. F. TUNNARD, OF EAST BATON ROUGE PARISH, LOUISIANA.

Letters Patent No. 93,140, dated July 27, 1869.

---

IMPROVEMENT IN CORN-PLANTERS.

---

The Schedule referred to in these Letters Patent and making part of the same.

---

*To all whom it may concern:*

Be it known that I, W. F. TUNNARD, of the parish of East Baton Rouge, State of Louisiana, have invented a certain new and useful Improvement in Corn-Planters; and I do hereby declare the following to be a full, clear, and exact description of the same, reference being had to the annexed drawing, making a part of this specification, in which—

Figure 1:
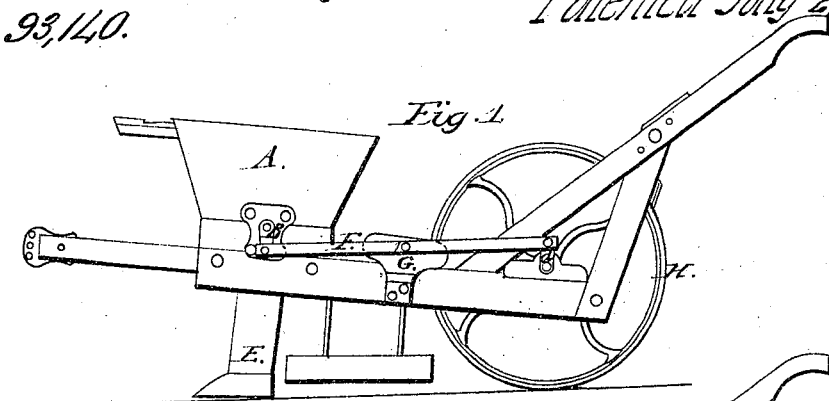
Figure 2:
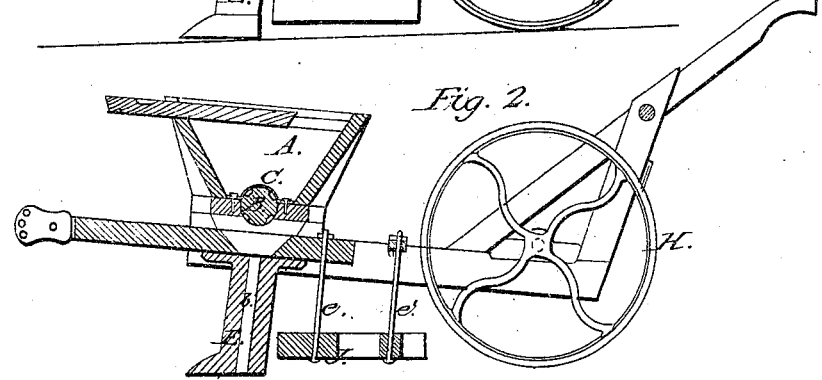
Figure 3:
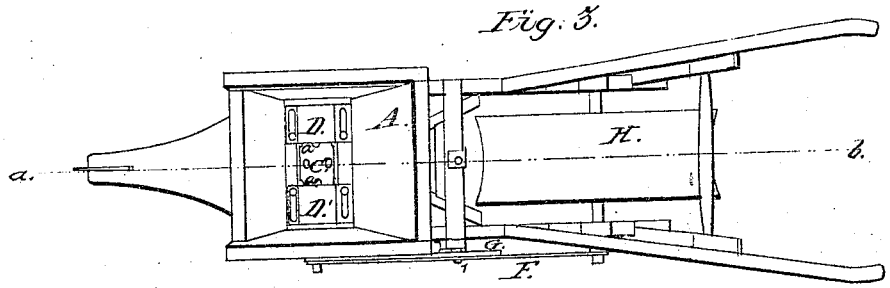

Figure 1 is a side elevation of a machine, in which my improvement is presented;

Figure 2, a sectional view of the same machine, on line *a b*, fig. 3; and

Figure 3, a plan or top view of it.

The object of my invention is to simplify, cheapen, and make more efficient C. W. McClanahan's improvement in cotton-seed and corn-planters, as patented by him, November 27, 1860, so as to make the corn-planter distinct and separate from the cotton-planter; and I accomplish my object by dispensing with the cotton-seed stirrer, so called in said patent, the arch-formed cover within the hopper-recipient for the seed, and one of the crank-arms used in McClanahan's machine, to wit, the one which operates the stirrer, and by substituting a triangular fluke to cover the seed after they are dropped, in lieu of the side coverers that are employed in said machine.

But my invention will be more quickly and better understood by referring to the drawings, on which the same letters denote corresponding parts at all the figures.

A is the hopper-recipient for the seed to be planted, which may be of the form shown, or of any other that is equally suitable.

This hopper is placed relatively to the other parts of the machine, substantially as shown, and at its bottom I introduce a transverse shaft, B, on which is mounted, (as shown at fig. 3,) a seed-dropping drum or cylinder C, three inches in length and two inches in diameter, or thereabouts.

Around the circumferential surface of drum C, I make the perforations or cup-recesses *a*, into which the corn finds its way as the drum revolves, in the operation of the machine, and is dropped at prescribed distances or intervals, accordingly as the soil is richer or poorer, and it may be desired to make the hills wider apart or nearer together, the sliding covers D D' over said drum enabling me to control this matter by covering all the recesses at pleasure from which it is not desired to drop the seed in any given field.

The seed, as they leave the recesses and fall into the central opening or conduit *b* in the shoe and trench-opener E, are conducted by said opener *b* to the bottom of the trench made by said opener.

The shaft B is provided with a crank, *c*, to which, by a proper crank, a crank-arm or pitman, F, is secured at its front extremity.

The pitman F is provided at its centre with a pin, 1, which projects from its side through an elongated slot in a fixed plate-standard, G, that is securely fastened to one of the longitudinal pieces of the frame of the machine.

At its rear end the pitman F is secured to a crank, *d*, having precisely the same stroke as crank *a*, on the axis of the driving-wheel H; the said axis being supported in proper journals near the rear end of the machine, as shown.

The function subserved by the placing of the pin 1 in the slot in the standard G, or rather by the combined action of the pin and the slot, is exceedingly important, for thereby the regular rotation of the seed-dropping drum C is secured in the reverse direction to the rotation of the wheel H, and all danger of the said drum stopping on the dead-points of the crank *c* is rendered impossible.

The length of the slot in the standard G must be equal to the stroke of the cranks *c d*, and it must be cut in the direction of its length precisely coincident to the line between the centres of the axes of the shaft B and the wheel H.

Between the wheel H and the shoe E, a covering triangular fluke, J, is secured by pendant adjustable rods *e e'*, substantially as shown.

The point of the fluke J is placed exactly in the centre of the machine, and hence, it follows in the line of the conduit *b*, in the shoe E, and therefore of the corn that drops through the same into the trench made by the said shoe.

The office performed by the fluke J is to cover the seed immediately after being dropped in the trench, so that the wheel H, which is provided with a broad tread or tire for the purpose, (see fig. 3,) as it comes over the seed, will press the earth down upon them, whilst it carries forward the machine, and, through the agency of the pitman F and its adjuncts, at the same time operates the drum C.

Having thus described my invention,

What I claim, and desire to secure by Letters Patent, is—

1. The pitman F, provided with a pin, 1, which works in a slot in a fixed plate-standard, G, in combination with a seed-dropping drum or cylinder C and regulating sliding covers D D', when those several parts are constructed, arranged, and operate substantially as herein described, for the purpose set forth.

2. The above combination, in combination with a trench-opening shoe E and a covering-fluke, J, substantially as herein described, for the purpose set forth.

W. F. TUNNARD.

Witnesses:
 RUFUS R. RHODES,
 H. N. JENKINS.